United States Patent Office 2,702,968
Patented Mar. 1, 1955

2,702,968

METHOD OF PREPARING GLASS FOR WORKING

Roy H. Dreshman, Homestead, Pa.

No Drawing. Application May 18, 1951,
Serial No. 227,125

2 Claims. (Cl. 49—84)

This invention relates generally to the method of working glass articles and more particularly to the method of preparing the article by heating before working the same such as attaching it to other glass, drawing, reshaping, burning off or performing other working steps thereon.

The object of this invention is the provision of a method of applying heat to a glass article, regardless of its cross sectional shape, to provide a uniform distribution of heat on the surface to be worked by oscillating either the glass article or the source of heat, or both, whether the heat source is a fluid fuel, flame or a high-frequency induction current. When oscillating both, they must be at different speeds or in opposite directions at the same time. The oscillatory action unifies the distribution of heat over the surface of the glass better than when the article or heat is rotated. This is particularly true when the glass articles are non-round and cannot be rotated within an annular heating device while maintaining a constant spacing between the source of heat and the glass.

Regardless of the shape of the section of the glass being heated, it is preferable for the source of heat to have the same approximate shape. If the source of heat is a fluid fuel, the burner should be the same shape and sufficiently larger to permit either to be oscillated. If the source of heat is a high frequency and contact is required, the electrode may have the same shape as the glass area to be heated but resiliently engaging this surface. If space is required between the electrode and the glass then the electrode may be rigid and have a larger opening to permit the electrode or the glass to be oscillated.

This method of preparing the glass article for working may be applied to other articles such as thermoplastic resins or to metal and the claims are so intended.

The article and the source of heat may be supported and oscillated manually or by machine. Many different applications of levers, cranks or cams may be applied to effect such oscillation. If the cross section being heated is angular but not normal to the axis on which the article is supported, the oscillation may be along an inclined helical path. The hand may grasp the article and oscillate it back and forth while raising it up and down to maintain the heat in an inclined arcuate path on the article wherein application of heat is along the same line or zone.

If the glass article is held stationary the source of heat may be oscillated about the glass or they both may be oscillated in the same direction at different speeds or in opposite directions.

It is preferably to employ a fixed axis to guide the oscillating part when operating this invention by hand as it is difficult to hold the part on a true center when oscillating it.

While, for clarity of explanation, certain embodiments of this invention have been described, it is to be understood that this invention is capable of many modifications and many changes may be made therein without departing from the spirit and scope of this invention.

I claim:

1. The method of preparing a nonround tubular glass article for working which comprises, supporting the nonround tubular glass article on its axis, applying heat of the same approximate shape as that of the cross-section of the nonround article by directing it to a predetermined annular surface area of the nonround tubular glass article to soften an annular zone of the glass for working, and effecting a relative oscillatory motion between the directed heat and the nonround tubular glass article by oscillating both simultaneously to unify the distribution of heat over the predetermined annular surface area of the glass.

2. The method of preparing a nonround tubular glass article for working which comprises, supporting the nonround tubular glass article on its axis, applying heat of the same approximate shape as that of the cross-section of the nonround article by directing it a predetermined distance from the nonround annular surface area of the nonround tubular glass article to soften the glass for working, and simultaneously oscillating the glass article and the directed heat in opposite directions about their axis to unify the distribution of heat over the predetermined annular surface area of the nonround tubular glass.

References Cited in the file of this patent

UNITED STATES PATENTS

| 1,577,538 | Parker | Mar. 23, 1925 |
| 1,960,222 | Long | May 22, 1934 |
| 2,131,406 | Mosmieri et al. | Sept. 27, 1938 |
| 2,194,760 | Long | Mar. 26, 1940 |

FOREIGN PATENTS

| 272,308 | Great Britain | June 15, 1927 |